United States Patent
Andersen et al.

(10) Patent No.: US 10,618,000 B2
(45) Date of Patent: Apr. 14, 2020

(54) COATED ARTICLES HAVING HIGH KNOX/KSOX RATIOS FOR SELECTIVE CATALYTIC REDUCTION

(71) Applicant: Johnson Matthey Public Limited Company, London (GB)

(72) Inventors: Paul Joseph Andersen, Audubon, PA (US); Maria Brandmair, Redwitz (DE); Silvia Alcove Clave, Reading (GB); Rodney Foo, Caversham (GB); Bruce Gomersall, Reading (GB); Michael Nash, Reading (GB); Alison Mary Wagland, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/694,051

(22) Filed: Sep. 1, 2017

(65) Prior Publication Data
US 2018/0021724 A1 Jan. 25, 2018

Related U.S. Application Data

(63) Continuation of application No. 14/726,719, filed on Jun. 1, 2015.

(60) Provisional application No. 62/006,482, filed on Jun. 2, 2014.

(51) Int. Cl.
| | | |
|---|---|---|
| B01D 53/86 | (2006.01) | |
| B01J 38/00 | (2006.01) | |
| B01J 37/02 | (2006.01) | |
| B01J 23/28 | (2006.01) | |
| B01J 23/30 | (2006.01) | |
| B01D 53/94 | (2006.01) | |
| B01J 35/02 | (2006.01) | |
| B01J 38/48 | (2006.01) | |
| B01J 23/92 | (2006.01) | |
| B01J 37/08 | (2006.01) | |
| B01D 53/88 | (2006.01) | |
| B01D 53/96 | (2006.01) | |
| B01J 35/04 | (2006.01) | |

(52) U.S. Cl.
CPC ..... *B01D 53/8628* (2013.01); *B01D 53/9418* (2013.01); *B01J 23/28* (2013.01); *B01J 23/30* (2013.01); *B01J 23/92* (2013.01); *B01J 35/023* (2013.01); *B01J 37/0215* (2013.01); *B01J 37/0225* (2013.01); *B01J 37/0232* (2013.01); *B01J 37/0234* (2013.01); *B01J 37/0244* (2013.01); *B01J 38/00* (2013.01); *B01J 38/485* (2013.01); *B01D 53/88* (2013.01); *B01D 53/96* (2013.01); *B01D 2251/2062* (2013.01); *B01D 2255/2092* (2013.01); *B01D 2255/20707* (2013.01); *B01D 2255/20723* (2013.01); *B01D 2255/20769* (2013.01); *B01D 2255/20776* (2013.01); *B01D 2255/30* (2013.01); *B01D 2255/40* (2013.01); *B01D 2255/9202* (2013.01); *B01D 2258/012* (2013.01); *B01D 2258/0283* (2013.01); *B01J 35/04* (2013.01); *B01J 37/08* (2013.01); *B01J 2523/00* (2013.01); *B01J 2523/41* (2013.01)

(58) Field of Classification Search
CPC ............ B01D 53/8628; B01D 53/9418; B01D 2255/30; B01D 2258/012; B01D 2255/2092; B01D 2255/20723; B01D 2255/20769; B01D 53/96; B01D 2251/2062; B01D 2255/20776; B01D 53/88; B01D 2255/20707; B01D 2258/0283; B01D 2255/40; B01D 2255/9202; B01J 38/00; B01J 37/08; B01J 37/0215; B01J 23/90; B01J 23/28; B01J 23/22; B01J 23/30; B01J 21/063
See application file for complete search history.

(56) References Cited

U.S. PATENT DOCUMENTS

| | | | | |
|---|---|---|---|---|
| 5,166,122 | A | * 11/1992 | Teshima | ............. B01D 53/8628 502/309 |
| 5,225,390 | A | 4/1993 | Vogel et al. | |
| 6,054,408 | A | 4/2000 | Hums et al. | |
| 6,710,013 | B1 | 3/2004 | Kato et al. | |
| 6,941,742 | B1* | 9/2005 | Neufert | ............. B01D 53/8609 423/238 |
| 7,741,239 | B2* | 6/2010 | Hartenstein | ............. B01J 21/20 502/20 |
| 7,842,644 | B2 | 11/2010 | Kai et al. | |
| 8,071,038 | B2 | 12/2011 | Girard et al. | |
| 8,470,728 | B2 | 6/2013 | Kato et al. | |
| 2006/0039843 | A1 | 2/2006 | Patchett et al. | |
| 2009/0311155 | A1 | 12/2009 | Kai et al. | |
| 2010/0093517 | A1 | 4/2010 | Kato | |
| 2011/0250114 | A1 | 10/2011 | Augustine et al. | |

FOREIGN PATENT DOCUMENTS

| | | |
|---|---|---|
| CN | 103866151 A | 6/2014 |
| EP | 0360548 A1 | 3/1990 |

(Continued)

*Primary Examiner* — Anthony J Zimmer

(57) ABSTRACT

Articles comprising a catalyst film comprising VOx, MoO$_3$ or WO$_3$, and TiO$_2$ deposited on a substrate are disclosed. The articles are useful for selective catalytic reduction (SCR) of NOx in exhaust gases. Methods for producing such articles deposit a catalyst film on the substrate to form a coated substrate, which is then calcined. When used in an SCR process, the coated articles have enhanced activity for NOx conversion, reduced activity for SOx conversion, or both. Light-weight, coated articles having high catalyst loads can be fabricated at the same or reduced dimensions when compared with laminated articles, and increased kNOx/kSOx ratios are available even from coated articles having relatively thin catalyst films. The articles should have particular value for power plant operations, where coal and high-sulfur fuels are commonly used and controlling sulfur trioxide generation is critical.

16 Claims, No Drawings

(56) References Cited

FOREIGN PATENT DOCUMENTS

| EP | 2165763 A1 | 6/2008 | |
|---|---|---|---|
| EP | 1938899 A1 | 7/2008 | |
| EP | 2100664 A1 | 9/2009 | |
| RU | 2186621 C1 | 8/2002 | |
| WO | WO-2008089957 A1 * | 7/2008 | ......... B01D 53/9418 |

* cited by examiner

US 10,618,000 B2

COATED ARTICLES HAVING HIGH KNOX/KSOX RATIOS FOR SELECTIVE CATALYTIC REDUCTION

CROSS-REFERENCE TO RELATED APPLICATIONS

This application is a Continuation of U.S. patent application Ser. No. 14/126,719, filed on Jun. 1, 2015, which claims priority to U.S. Provisional Application No. 62/006,482, filed on Jun. 2, 2014, the disclosures of which are incorporated herein by reference in their entireties for all purposes.

FIELD OF THE INVENTION

The invention relates to selective catalytic reduction (SCR) catalysts and to coated articles comprising such catalysts.

BACKGROUND OF THE INVENTION

Hydrocarbon combustion in diesel engines, stationary gas turbines, and other systems generates exhaust gas that must be treated to remove nitrogen oxides (NOx), which consists of NO (nitric oxide), $NO_2$ (nitrogen dioxide), and $N_2O$ (nitrous oxide). The exhaust generated in lean-burn engines is generally oxidative, and the NOx needs to be reduced selectively with a catalyst and a reductant, which is typically ammonia or a short-chain hydrocarbon. The process, known as selective catalytic reduction (SCR), has been extensively investigated.

Power plants often utilize fossil fuels, such as coal, oil or natural gas, as the energy source. Coal and oil contain various amounts of sulfur. Treatment of exhaust from these plants using SCR demands maintaining a high NOx reduction efficiency while minimizing $SO_2$ oxidation. Many SCR catalysts are effective in converting NOx to nitrogen and water in the presence of ammonia. However, an undesirable side reaction, the oxidation of $SO_2$ to $SO_3$, commonly occurs along with NOx reduction. The formation of sulfur trioxide ($SO_3$), a component of acid rain, needs to be controlled. Thus, a catalyst that maximizes the rate of NOx reduction (kNOx) while minimizing the rate of $SO_2$ oxidation (kSOx) is highly desirable.

SCR catalysts commonly include vanadium oxides combined with molybdenum or tungsten oxides and supported on titania. The literature includes many examples of such catalysts. In some cases, a catalyst mixture is applied to a substrate by a dip coating process (see, e.g., U.S. Pat. Nos. 5,166,122 and 7,842,644). A wet paste containing the catalyst can be rolled onto the substrate, which is then dried and calcined (see, e.g., U.S. Pat. Nos. 5,225,390; 5,045,516; 6,054,408; and 7,842,644). Alternatively, the wet paste is pressed, dried, and calcined to form a thin plate (see, e.g., U.S. Pat. Nos. 5,409,681; 5,792,432; 6,063,342; 6,710,013; and 6,759,565). Spray or dip-coating is generally not used commercially to produce articles comprising VOx-based SCR catalysts.

The industry would benefit from ways to make improved articles useful for SCR catalysis. In particular, articles having the ability to effectively reduce NOx while simultaneously controlling the rate at which sulfur dioxide is oxidized to sulfur trioxide would be valuable. Thus, articles that can yield higher kNOx/kSOx ratios in an SCR process are needed. Ideally, the articles could make more efficient use of the catalytic materials that make up their active components.

SUMMARY OF THE INVENTION

In one aspect, the invention relates to an article for treating a gas containing nitrogen oxides. The article comprises a substrate, preferably stainless-steel, having a catalyst film coating on the surface of the substrate. The coating can be deposited on the substrate by various techniques, including spraying and dip-coating, preferably by spraying.

In another aspect, the invention relates to regenerated catalytic articles comprising a spent catalyst on a substrate with a catalyst film coating located over the spent catalyst.

In yet another aspect, the invention relates to a method for producing an article useful for selective catalytic reduction and to coated articles made using the method. The method comprises coating, preferably by spraying, a substrate, preferably stainless-steel, to deposit a film on the substrate and then calcining the coated substrate. The catalyst film comprises VOx, $MoO_3$ or $WO_3$, and $TiO_2$. Preferably the catalyst film comprises 0.1 to 5 wt. % of VOx, 0.5 to 20 wt. % of $MoO_3$ or $WO_3$, and 75 to 99.4 wt. % of $TiO_2$. The levels of VOx are analyzed and reported as $V_2O_5$.

In still another aspect, the invention relates to a method for producing regenerated articles by applying a catalyst film coating over a spent catalyst coating on the substrate.

In another aspect, the invention relates to a process for selectively reducing nitrogen oxides in a gaseous mixture comprising nitrogen oxides in the presence of a reductant and a coated article having catalytic activity.

It has been surprisingly found that coated articles typically have enhanced activity for NOx conversion at a temperature between 350° C. and 400° C., reduced activity for SOx conversion at a temperature between 380° C. and 430° C., or both, where the NOx and SOx conversions are measured at atmospheric pressure. The coated articles and methods of using the coated articles provide a way to achieve high NOx reduction while minimizing the rate at which $SO_3$ is generated. Additionally, compared with laminated articles of similar overall dimensions and composition, the coated articles are usually lighter. Coated articles having high catalyst loads can be fabricated at the same or reduced dimensions when compared with laminated articles, and that increased kNOx/kSOx ratios are available even from coated articles having relatively thin (e.g., 20-500 μm or 50 to 150 μm) catalyst films.

The articles and methods are useful for a variety of SCR applications, and should have particular value for power plant operations, where coal and high-sulfur fuels are commonly used and controlling sulfur trioxide generation is critical.

DETAILED DESCRIPTION OF THE INVENTION

The term VOx means an oxide of vanadium, preferably with vanadium in the +5 oxidation state dispersed on a mixed oxide support. The principle oxides of vanadium are:
Vanadium(II) oxide (vanadium monoxide), VO;
Vanadium(III) oxide (vanadium sesquioxide or trioxide), $V_2O_3$;
Vanadium(IV) oxide (vanadium dioxide), $VO_2$; and
Vanadium(V) oxide (vanadium pentoxide), $V_2O_5$.

The term "a VOx precursor" means a compound that contains vanadium and the compound forms an oxide of vanadium on calcination. Examples of such compounds include, but are not limited to: vanadium oxysulfate, ammonium metavanadate, and vanadium oxytrichloride.

The term "a $MoO_3$ precursor" means a compound that contains molybdenum and the compound forms an oxide of molybdenum on calcination. Examples of such compounds include, but are not limited to ammonium heptamolybdate, ammonium molybdate, molybdenum chloride, molybdenum oxalate, and molybdenum acetate.

The term "a $WO_3$ precursor" means a compound that contains tungsten and the compound forms an oxide of tungsten on calcination. Examples of such compounds include, but are not limited to tungsten chloride, tungsten oxychloride, tungstic acid, ammonium metatungstate, ammonium paratungstate or premanufactured tungsten/titania.

The term "a $TiO_2$ precursor" means a compound that contains titanium and the compound forms an oxide of titanium on calcination. Examples of such compounds include, but are not limited to titanium tetrachloride, titanium trichloride and titanium oxysulfate.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

The term "substrate" means a solid material on which a film is placed. The substrate can be in the form of a monolith, plate, or sheet, preferably a plate or sheet. The substrate is preferably perforated. The substrate can be composed of a metal, preferably a steel, more preferably a stainless steel or a Fecralloy.

The term "film" means a thin coating or covering. The thickness of the film is described below.

The term "regenerated article" means an article made from a used article having a used catalyst.

The term "used article" means an article comprises a used catalyst or an article that comprises a catalyst that does not provide an effective level of SCR activity. The article does not have to have been used in an SCR process but can include rejected or off-specification articles.

The term "used catalyst" means a catalyst that had previously been deposited on an article and the SCR activity of the catalyst had been reduced to a level that was no acceptable to a user of the catalyst.

When a range, or ranges, for various numerical elements are provided, the range, or ranges, can include the values, unless otherwise specified.

In one aspect, the invention relates to an article comprising: (a) a substrate; and (b) a film deposited on the substrate; where the film comprises $VO_x$, $MoO_3$ or $WO_3$, and $TiO_2$, and the article catalyzes the conversion of nitrogen oxides in a gas containing nitrogen oxides. Catalysts comprising vanadium oxides, molybdenum or tungsten oxides, and titania are well known for use in SCR processes. For examples of similar catalysts and their methods of preparation, see U.S. Pat. Nos. 5,225,390; 6,054,408; and 7,842,644, the teachings of which are incorporated herein by reference. The film can comprise 0.1 to 5 wt. % of $VO_x$, 0.5 to 20 wt. % of $MoO_3$ or $WO_3$, and 75 to 99.4 wt. % of $TiO_2$. The film can comprises 0.5 to 4 wt. % of VOx, 1 to 15 wt. % of $MoO_3$ or $WO_3$, and 81 to 98.5 wt. % of $TiO_2$. The film can comprises 0.5 to 2 wt. % of VOx, 1 to 10 wt. % of $MoO_3$ or $WO_3$, and 88 to 98.5 wt. % of $TiO_2$. The amount of VOx in the film can range from 0.1 wt. % to 5 wt. %, inclusive. The amount of VOx in the film can be about 0.1 wt. %; about 0.2 wt. %; about 0.3 wt. %; about 0.4 wt. %; about 0.5 wt. %; about 0.6 wt. %; about 0.7 wt. %; about 0.8 wt. %; about 0.9 wt. %; about 1.0 wt. %; about 1.5 wt. %; about 2.0 wt. %; about 2.5 wt. %; about 3.0 wt. %; about 3.5 wt. %; about 4.0 wt. %; about 4.5 wt. %; about 5.0 wt. %. The amount of $MoO_3$ or $WO_3$ in the film can range from 0.5 wt. % to 20 wt %, inclusive. The amount of $MoO_3$ or $WO_3$ in the film can be about 0.5 wt. %; about 0.6 wt. %; about 0.7 wt. %; about 0.8 wt. %; about 0.9 wt. %; about 1 wt. %; about 2 wt. %; about 3 wt. %; about 4 wt. %; about 5 wt. %; about 6 wt. %; about 7 wt. %; about 8 wt. %; about 9 wt. %; about 10 wt. %; about 11 wt. %; about 12 wt. %; about 13 wt. %, about 14 wt. %; about 15 wt. %; about 16 wt. %; about 17 wt. %, about 18 wt. %; about 19 wt. %; about 20 wt. %. The amount of $TiO_2$ in the film can range from 75 to 99.4 wt %, inclusive. The amount of $TiO_2$ in the film can range from a minimum of about 75 wt. %; about 80 wt. %; about 85 wt. %; about 90 wt. %; about 91 wt. %; about 92 wt. %; about 93 wt. %; about 94 wt. %; to a maximum of about 95 wt. %; about 96 wt. %; about 97 wt. %; about 98 wt. %; about 99 wt. %; about 99.1 wt. %; about 99.2 wt. %; about 99.3 wt. %; about 99.4 wt. %. These amounts of $VO_x$, $MoO_3$ or $WO_3$, and $TiO_2$ also apply to each aspect of the invention as described herein.

The coated articles generally have thicknesses in the range of 0.1 to 5 mm, more preferably 0.2 to 2 mm, most preferably 0.5 to 1.5 mm.

The article comprises a film that can have a thickness of from about 20 μm to about 500 μm, inclusive. The minimum thickness of the film can be about 20 μm, about 30 μm, about 40 μm or about 50 μm, inclusive. The maximum thickness of the film can be about 450 μm, about 400 μm, about 350 μm, about 300 μm, about 250 μm, about 200 μm, or about 1500 μm, inclusive. The film can have a thickness of from about 50 μm to about 450 μm, of from about 50 μm to about 400 μm, of from about 50 μm to about 350 μm, of from about 50 μm to about 300 μm, of from about 50 μm to about 250 μm, of from about 50 μm to about 200 μm, or of from about 50 μm to about 150 μm. These film thicknesses also apply to each aspect of the invention as described herein.

The substrate can be in the form of a monolith or a plate, preferably a plate. The substrate is preferably perforated. The substrate comprises a metal, preferably a steel, more preferably a stainless steel or a Fecralloy.

The film deposited on the substrate can be a spray coated film, an electrostatic coating, a dip coated film or any other type of film suitable for depositing on the substrate.

The article can have less mass of catalyst and at least one of: (a) enhanced activity for NOx conversion at a temperature between 350° C. and 400° C.; and (b) reduced activity for SOx conversion at a temperature between 380° C. and 430° C., compared with a laminated article of similar dimensions and composition. The coating on the substrate of the articles described herein preferably contains less mass of catalyst than is used in other forms of articles, such as a laminate on a plate catalyst. The invention is not limited to any particular theory of operation; however, the improvements may take advantage of the fact that when the particularly claimed catalyst composition is used under normal operating conditions, NOx reduction is limited by mass transfer, while SOx reduction is temperature-dependent and kinetically limited. Thus, thin layers having a high concentration of active catalyst can successfully reduce SOx oxidation without adversely affecting NOx conversion.

The activity of the catalyst in NOx conversion can be determined by passing a gas comprising a mixture of NO, $NH_3$, $O_2$, $H_2O$, $SO_2$ and $N_2$ over an article having the catalyst film at 382° C. where the article is contained in a reactor; and measuring the changes in the concentrations of NOx. VGB Guideline for the Testing of DENOX Catalysts, VGB-R 302 He, $2^{nd}$ revised edition (1998) describes such a procedure. The concentrations of NOx can be determined using an FTIR gas analyzer. Similarly, the activity of the catalyst in SOx conversion can be determined by passing a gas comprising a mixture of $O_2$, $H_2O$, $SO_2$ and $N_2$ over an article having the catalyst film at 400° C. where the article is contained in a same type of reactor used for measuring NOx conversion; and measuring the changes in the concentrations of SOx. The concentration of SOx can be determined using EPA method 8A. Details of a method that can be used are also provided in the examples below.

In a preferred aspect, the coated article has less mass compared with a laminated article of similar dimensions and composition. Coating, especially spray coating, also provides the opportunity to increase surface area by coating outer surfaces of a substrate, e.g., a metal mesh, while leaving internal spaces free of catalyst. Consequently, when compared with articles made by lamination, diffusion of gaseous mixtures through the article is enhanced, and NOx conversions improve. The rate of sulfur dioxide oxidation is also reduced in the lighter weight, coated articles.

The ratio of the rate of conversion of NOx (kNOx) to the rate of conversion of SOx (kSOx) can be from 0.22 to 0.35, inclusive. The ratio of the rate of conversion of NOx (kNOx) to the rate of conversion of SOx (kSOx) can be 0.22, 0.23, 0.24, 0.25, 0.26, 0.27, 0.28, 0.29, 0.30, 0.31, 0.32, 0.33, 0.34 and 0.35. Preferably the ratio of the rate of conversion is at least about 0.25 to about 0.30. These ratios also apply to each aspect of the invention as described herein.

In another aspect, the invention relates to an article comprising: (a) a substrate; and (b) a film deposited on the substrate; where the film comprises VOx, $MoO_3$ or $WO_3$, and $TiO_2$. Preferably the film comprises 0.1 to 5 wt. % of VOx or a VOx precursor, 0.5 to 20 wt. % of $MoO_3$, a $MoO_3$ precursor, $WO_3$, a$WO_3$ precursor or a mixture thereof, and 75 to 99.4 wt. % of $TiO_2$ or a $TiO_2$ precursor. The article, upon calcination, catalyzes the conversion of nitrogen oxides in a gas containing nitrogen oxides.

The film can have a composition and a thickness as described above.

The substrate can be in the form of a monolith, plate, or sheet, preferably a plate or sheet. The substrate is preferably perforated. The substrate comprises a metal, preferably a steel, more preferably a stainless steel or a Fecralloy.

The film deposited on the substrate can be formed by a variety of techniques including spray coating, dip coating.

The article upon calcination, can have less mass and at least one of: (a) enhanced activity for NOx conversion at 382° C.; and (b) reduced activity for SOx conversion at 400° C., compared with a laminated article of similar dimensions and composition. The ratio of the rate of conversion of NOx (kNOx) to the rate of conversion of SOx (kSOx) using the calcined articles is described above.

In other aspects, the invention relates to regenerated articles useful for selective catalytic reduction. In normal use, articles used for SCR can become deactivated. Instead of replacing the deactivated article, it may be more desirable to reactivate it. It is known in the art to reactivate used articles by first removing particulates from the support and then applying a new catalyst. In the process of regenerating the catalytic activity of an article according to these aspects of the invention, an article is formed comprising: (a) a substrate; (b) a used catalyst on the surface of a substrate; and (c) a film deposited over the used catalyst, where the film deposited over the used catalyst comprises VOx, $MoO_3$ or $WO_3$, and $TiO_2$. Preferably the film comprises 0.1 to 5 wt. % of VOx or a VOx precursor, 0.5 to 20 wt. % of $MoO_3$, a $MoO_3$ precursor, $WO_3$, a$WO_3$ precursor or a mixture thereof, and 75 to 99.4 wt. % of $TiO_2$ or a $TiO_2$ precursor. The article, upon calcination, catalyzes the conversion of nitrogen oxides in a gas containing nitrogen oxides.

The film that can have a composition and a thickness as described above.

The substrate can be in the form of a monolith, plate, or sheet, preferably a plate or sheet. The substrate is preferably perforated. The substrate comprises a metal, preferably a steel, more preferably a stainless steel or a Fecralloy.

The film deposited on the substrate can be a spray coated film or a dip coated film.

The article can have, compared with a laminated article of similar dimensions and composition, less mass and at least one of: (a) enhanced activity for NOx conversion at 382° C.; and (b) reduced activity for SOx conversion at 400° C. The ratio of the rate of conversion of NOx (kNOx) to the rate of conversion of SOx (kSOx) using the calcined articles is described above.

The regenerated article comprises: (a) a substrate; (b) a used catalyst on the surface of a substrate; and (c) a film deposited over the used catalyst, where the film deposited over the used catalyst comprises VOx, $MoO_3$ or $WO_3$, and $TiO_2$. Preferably the film comprises 0.1 to 5 wt. % of VOx, 0.5 to 20 wt. % of $MoO_3$, $WO_3$, or a mixture thereof, and 75 to 99.4 wt. % of $TiO_2$. The article catalyzes the conversion of nitrogen oxides in a gas containing nitrogen oxides.

The film can have a composition and a thickness as described above.

The substrate can be in the form of a monolith or plate, preferably a plate. The substrate is preferably perforated. The substrate preferably comprises stainless steel.

The film deposited on the substrate can be a spray coated film or a dip coated film.

The article can have, compared with a laminated article of similar dimensions and composition, less mass and at least one of: (a) enhanced activity for NOx conversion at 382° C.; and (b) reduced activity for SOx conversion at 400° C. The ratio of the rate of conversion of NOx (kNOx) to the rate of conversion of SOx (kSOx) using the calcined articles is described above.

In still another aspect, the invention relates to a method for producing an article having selective catalytic reduction activity. The method comprises (a) forming a coated substrate by depositing a catalyst film comprising: (i) VOx or a VOx precursor, (ii) $MoO_3$, a $MoO_3$ precursor, $WO_3$, a$WO_3$ precursor or a mixture thereof, and (iii) $TiO_2$ or a $TiO_2$ precursor, onto a substrate, and (b) calcining the coated substrate. The film can comprise 0.1 to 5 wt. % of VOx or a VOx precursor, 0.5 to 20 wt. % of $MoO_3$, a $MoO_3$ precursor, $WO_3$, a$WO_3$ precursor or a mixture thereof, and 75 to 99.4 wt. % of $TiO_2$ or a $TiO_2$ precursor. The film can comprise 0.5 to 2 wt. % of $VO_x$ or a $VO_x$ precursor, 1 to 10 wt. % of $MoO_3$, a $MoO_3$ precursor, $WO_3$, a$WO_3$ precursor or a mixture thereof, and 88 to 98.5 wt. % of $TiO_2$ or a $TiO_2$ precursor. The film can have a thickness of from about 20 μm to about 500 μm, preferably from about 50 μm to about 150 μm. The substrate can be in the form of a monolith or plate, preferably a plate. The substrate is preferably perforated. The substrate preferably comprises stainless steel. The film deposited on the substrate can be a spray coated film or a dip coated film.

The article prepared by the method described above can have, compared with a laminated article of similar dimensions and composition, less mass and at least one of: (a) enhanced activity for NOx conversion at 382° C.; and (b) reduced activity for SOx conversion at 400° C. The ratio of the rate of conversion of NOx (kNOx) to the rate of conversion of SOx (kSOx) using the calcined articles is described above.

Calcining the coated substrate can be performed at a temperature within the range of 400° C. to 1200° C., preferably within the range of 400° C. to 650° C.

A washcoat suspension comprising catalyst, additives, and water is prepared for use in coating a support. The washcoat preferably has a solids content within the range of 20 to 60 wt. %, more preferably 25 to 50 wt. %, most preferably 30 to 40 wt. %. Thus, water is preferably present at 40 to 80 wt. %, more preferably 50 to 75 wt. %, most preferably 60 to 70 wt. %. The solids content comprises the catalyst and any additives. Usually, the solids comprise 50 to 99 wt. %, more preferably 60 to 95 wt. %, and most preferably 75 to 85 wt. % of catalyst. The additives, which may include glass particles, alumina, silica, silica-aluminas, ceramics, molecular sieves, zeolites, clays, inorganic oxides, minerals, polymers, or other materials, make up the balance of the solids content. Preferably, the solids comprise 1 to 50 wt. %, more preferably 5 to 40 wt. %, most preferably 15 to 25 wt. % of the additives.

The washcoat components are combined in any desired order and are mixed until a homogeneous suspension is created. Preferably, high-shear mixing is used.

Before the washcoat is applied to the substrate, the substrate is preferably heated to a temperature within the range of 250° C. to 1000° C., more preferably 300° C. to 900° C., most preferably 400° C. to 800° C. prior to being coated with the washcoat suspension. The washcoat is coated, preferably by spraying, onto a substrate that is preferably hot to allow water and any other volatile materials in the washcoat suspension to vaporize, thereby depositing a catalyst film on the substrate.

The film can be applied to the substrate by spray coating, dip coating or electrostatically applying the coating. Spray coating is well known in other fields, but it is not known for use with the SCR catalysts described here, and no advantage of spray coating is apparent when compared with other commonly used methods such as pressure rolling, or extrusion. Spray coating generally involves preparing a washcoat suspension comprising catalyst, additives, and water. Pressurized air, nitrogen, or other gas is used with a spray gun, atomizer, or similar device to apply a thin layer of catalyst suspension as a spray or mist to a substrate to be coated. When the spray coating is applied to a heated substrate, water vaporizes, depositing a catalyst film on the substrate. The spray coating can be applied multiple times to gradually create a catalyst film of any desired thickness.

Dip coating generally involves preparing a washcoat suspension comprising catalyst, additives, and water. The substrate can be dipped into the washcoat suspension then withdrawn to apply a thin layer of a catalyst suspension to a substrate to be coated. The coated article and/or the washcoat suspension can be used at an elevated temperature to help the water evaporate when the substrate with a layer of washcoat is removed from a bulk washcoat mixture and the substrate with the washcoat is heated to vaporize the water, to form a substrate having a catalyst film on surface of the substrate. When using a washcoat at an elevated temperature, the composition may change over time do to the evaporation of water, unless water is added to the washcoat to replace the amount of water lost by evaporation. A substrate having a catalyst film on surface of the substrate can be recoated to gradually create a catalyst film of a desired thickness by dipping the substrate into a washcoat solution multiple times with the removal of water between dippings.

After the catalyst film has been applied, the coated substrate is calcined to generate the desired mixed oxide catalyst and to generate adhesion and cohesion by generating interparticulate bonding. Heating of the coated substrate also removes moisture and any other volatile materials. Preferably, the coated substrate is calcined at a temperature within the range of 400° C. to 1200° C., preferably 450° C. to 700° C., and more preferably 500° C. to 650° C. The calcination is preferably done under dry conditions, but it can also be performed hydrothermally, i.e., in the presence of some moisture content.

The substrate is fabricated from stainless steel and preferably has a relatively high geometric surface area. It may take the form of mesh, sheet, plate, monolith, honeycomb, or the like. Preferred substrates are perforated, as in stainless-steel mesh. Preferably, the substrate is capable of fluting, stacking, and/or arranging into stackable units or groups. The substrate is preferably calcined prior to being coated. For example, stainless-steel mesh is preferably heated in an oven, on a hotplate, or otherwise to 500° C. to 1000° C., preferably 600° C. to 900° C., prior to coating. The substrate may also by abrasively treated, such as by grit, or sand, blasting.

Step (a) of forming a coated substrate by depositing a catalyst film comprising: (i) VOx or a VOx precursor, (ii) $MoO_3$, a $MoO_3$ precursor, $WO_3$, a$WO_3$ precursor or a mixture thereof, and (iii) $TiO_2$ or a $TiO_2$ precursor, onto a substrate can comprise a plurality of substeps. A coated substrate can be formed by depositing a catalyst film comprising (ii) $MoO_3$, a $MoO_3$ precursor, $WO_3$, a$WO_3$ precursor or a mixture thereof, and (iii) $TiO_2$ or a $TiO_2$ precursor, onto a substrate. This film coated substrate can then be calcined at a temperature of between about 650° C. and 1200° C. The calcined film can then be coated with a film comprising (i) VOx or a VOx precursor to form a substrate having a film on a calcined film. The substrate having a film on a calcined film can then be calcined at a temperature between about 500° C. and 700° C.

In another aspect of the invention, a method for producing an article comprising a film comprising $VO_x$ or a $VO_x$ precursor, $MoO_3$, a $MoO_3$ precursor, $WO_3$, a$WO_3$ precursor or a mixture thereof, $TiO_2$ or a $TiO_2$ precursor on a surface of a substrate, the method comprises forming a coated substrate by depositing a catalyst film comprising 0.1 to 5 wt. % of $VO_x$ or a $VO_x$ precursor, 0.5 to 20 wt. % of $MoO_3$, a $MoO_3$ precursor, $WO_3$, a$WO_3$ precursor or a mixture thereof, and 75 to 99.4 wt. % of $TiO_2$ or a $TiO_2$ precursor onto a substrate.

The article comprises a film that can have a composition and a thickness as described above.

The substrate can be in the form of a monolith, plate, or sheet, preferably a plate or sheet. The substrate is preferably perforated. The substrate preferably comprises stainless steel.

The film deposited on the substrate can be a spray coated film or a dip coated film.

The article can have, compared with a laminated article of similar dimensions and composition, less mass and, upon calcination, at least one of: (a) enhanced activity for NOx conversion at 382° C.; and (b) reduced activity for SOx conversion at 400° C. The ratio of the rate of conversion of NOx (kNOx) to the rate of conversion of SOx (kSOx) using the calcined articles is described above.

In still another aspect of the invention, a method for producing a selective catalytic reduction catalyst from a used SCR article comprises: (a) removing particulates from a used article; (b) forming a coated substrate by depositing a catalyst film comprising: (a) $VO_X$ or a $VO_X$ precursor, (b) $MoO_3$, a $MoO_3$ precursor, $WO_3$, a$WO_3$ precursor or a mixture thereof, and (c) $TiO_2$ or a $TiO_2$ precursor onto a substrate, and (c) calcining the coated substrate.

The film can comprise 0.1 to 5 wt. % of VOx or a VOx precursor, 0.5 to 20 wt. % of $MoO_3$, a $MoO_3$ precursor, $WO_3$, a$WO_3$ precursor or a mixture thereof, and 75 to 99.4 wt. % of $TiO_2$ or a $TiO_2$ precursor. The film can comprise 0.5 to 2 wt. % of VOx or a VOx precursor, 1 to 10 wt. % of $MoO_3$, a $MoO_3$ precursor, $WO_3$, a$WO_3$ precursor or a mixture thereof, and 88 to 98.5 wt. % of $TiO_2$ or a $TiO_2$ precursor. The film can have a thickness of from about 20 μm to about 500 μm, preferably from about 50 μm to about 150 μm. The substrate can be in the form of a monolith or plate, preferably a plate. The substrate is preferably perforated. The substrate preferably comprises stainless steel. The film deposited on the substrate can be a spray coated film or a dip coated film.

The article prepared by the method described above can have, compared with a laminated article of similar dimensions and composition, less mass and at least one of: (a) enhanced activity for NOx conversion at 382° C.; and (b) reduced activity for SOx conversion at 400° C. The ratio of the rate of conversion of NOx (kNOx) to the rate of conversion of SOx (kSOx) using the calcined articles is described above.

One aspect of the invention relates to a process for selective catalytic reduction. In this process, a gaseous mixture comprising nitrogen oxides is selectively reduced in the presence of a reductant and a coated article of the invention, as described above. The nitrogen oxides (principally NO and $NO_2$) are reduced to $N_2$ while the reductant is oxidized. When ammonia is the reductant, $N_2$ is also an oxidation product. Ideally, the only reaction products are water and $N_2$, although some $NH_3$ is usually oxidized with air to NO or $N_2O$.

The SCR process can be preferably performed at temperatures within the range of 100° C. to 650° C., preferably between 250° C. to 600° C.

The reductant can be a nitrogen compound or a short-chain ($C_1$-$C_8$) hydrocarbon. Preferably, the reductant is a nitrogen compound. Suitable nitrogen compounds include ammonia, hydrazine, and ammonia precursors such as, for example, urea, ammonium carbonate, ammonium carbamate, ammonium hydrogen carbonate, and ammonium formate. Ammonia is particularly preferred. When ammonia is the reductant, the process is understood as an "$NH_3$—SCR" process.

The gaseous mixture comprising nitrogen oxides may contain one or more of NO, $NO_2$, and $N_2O$ in addition to other non-NOx gases such as Na, $O_2$, CO, $CO_2$, $SO_2$, HCl and $H_2O$. Typically, the exhaust gas will contain from 1 to 10,000 ppm, more typically 10 to 1,000 ppm, even more typically 50 to 500 ppm of NO.

For examples of SCR processes, especially $NH_3$—SCR, see U.S. Pat. Nos. 4,695,437; 4,782,039; 6,713,030; 7,264,785; 7,498,010; and 8,091,351, the teachings of which are incorporated herein by reference.

A process for selectively reducing nitrogen oxides in a gaseous mixture comprises contacting a gaseous mixture comprising nitrogen oxides with a reductant in the presence of an article comprising (a) a substrate; and (b) a film deposited on the substrate; where the film comprises VOx, $MoO_3$ or $WO_3$, and $TiO_2$, and the article catalyzes the conversion of nitrogen oxides in a gas containing nitrogen oxides. The film can comprise 0.1 to 5 wt. % of $VO_x$, 0.5 to 20 wt. % of $MoO_3$ or $WO_3$, and 75 to 99.4 wt. % of $TiO_2$. The film can comprises 0.5 to 4 wt. % of VOx, 1 to 15 wt. % of $MoO_3$ or $WO_3$, and 81 to 98.5 wt. % of $TiO_2$. The film can comprises 0.5 to 2 wt. % of VOx, 1 to 10 wt. % of $MoO_3$ or $WO_3$, and 88 to 98.5 wt. % of $TiO_2$. The article catalyzes the conversion of nitrogen oxides in a gas containing nitrogen oxides.

The film that can have a composition and a thickness as described above.

The substrate can be in the form of a monolith, plate, or sheet, preferably a plate or sheet. The substrate is preferably perforated. The substrate preferably comprises stainless steel.

The film deposited on the substrate can be a spray coated film or a dip coated film.

The article upon calcination, can have less mass and at least one of: (a) enhanced activity for NOx conversion at 382° C.; and (b) reduced activity for SOx conversion at 400° C., compared with a laminated article of similar dimensions and composition. The ratio of the rate of conversion of NOx (kNOx) to the rate of conversion of SOx (kSOx) using the calcined articles is described above.

The step of contacting a gaseous mixture comprising nitrogen oxides with a reductant in the presence of an article comprising (a) a substrate; and (b) a film deposited on the substrate; where the film comprises VOx, $MoO_3$ or $WO_3$, and $TiO_2$, and the article catalyzes the conversion of nitrogen oxides in a gas containing nitrogen oxides, can be performed at a temperature within the range of about 100° C. to about 650° C., preferably within a range of about 170° C. to about 460° C.

Preferably the reductant is ammonia.

The process can provide at least one of: (a) enhanced activity for NOx conversion at 382° C.; and (b) reduced activity for SOx conversion at 400° C. The ratio of the rate of conversion of NOx (kNOx) to the rate of conversion of SOx (kSOx) is described above.

The coated articles are useful for SCR applications, particularly $NH_3$—SCR. Suitable applications include, among others, exhaust gas treatment from stationary sources such as thermal power plants, gas turbines, coal-fired power and cogeneration plants, plant and refinery heaters and boilers used in the chemical and petrochemical industries, furnaces, coke ovens, coffee roasting plants, municipal waste plants, and incinerators. The coated articles are also useful in vehicular applications, most notably for treating exhaust from diesel or other lean-burn internal combustion engines, or from engines powered by liquid petroleum gas or natural gas. The coated articles and regenerated articles are useful for power plants, especially plants that use coal or high-sulfur fuels as the energy source. Power plants normally operate at temperatures in the range of 300° C. to 420° C., at atmospheric pressure, and in a high particulate environment. The sulfur content of coal varies depending upon the type of coal, with bituminous coal having a sulfur content of from 0.7 to 4.0%. Typically, the exhaust gas will have a sulfur content in the range of 500 to 1500 ppm sulfur, but in some sources, the sulfur content will be 2000 to 3000 ppm or higher. High-sulfur content fuel sources can make it challenging to control the amount of $SO_2$ that gets further oxidized to $SO_3$. Power plants rely on SCR catalysts to remove NOx, but they require catalysts having the ability to do so while also minimizing the rate of $SO_2$ oxidation. The inventive coated articles improve on similar articles made by lamination by enabling lower kSOx oxidation rates.

The following examples merely illustrate the invention; the skilled person will recognize many variations that are within the spirit of the invention and scope of the claims.

EXAMPLE 1

Preparation of a Spray-Coated Vanadate/Molybdate Article

Titanium oxide (anatase) (112 g) was combined with a solution of ammonium metavanadate (3.7091 g of $NH_4VO_3$ in 130 g of water) at about 60° C. to give a suspension. A solution of ammonium heptamolybdate tetrahydrate (0.8715 g of $(NH_4)_6Mo_7O_{24}.4H_2O$ in 30 g of water) at about 40° C. was added, followed by a colloidal silica dispersion (40% dispersion, 52.50 g) and alumina fibers (7.0 g), and the suspension was mixed well. The resulting aqueous washcoat (400 g) has a total solids content of 35% (112 g), of which the catalyst is 80%, the silica dispersion is 15%, and the alumina fibers are 5%. The catalyst comprised 0.6 wt. % $VO_x$ and 2.7 wt. % $MoO_3$ on $TiO_2$.

Strips of perforated stainless-steel mesh (400 mm×25 mm×600 μm) were calcined at 750° C. for 2 h in a flat position. The mesh strips were heated on a hot plate to 180° C. The washcoat was applied from a gravity fed KITE FIAC (UK) compressed air spray gun having a 1 mm nozzle directly onto the heated mesh strips. After five or six sprays on both sides of the strips, about 2 g (1.65 to 1.92 g) of catalyst were deposited on each strip. The strips were calcined for 2 h at 500° C. The spray-coated article had a total thickness of 1.04 mm, with the catalyst film having a thickness of 0.44 mm, as measured using a Vernier caliper. The spray-coated strips had masses ranging from 10 to 11 g and averaging 10.5 g.

COMPARATIVE EXAMPLE 2

Preparation of a Laminated Vanadate/Molybdate Article

A catalyst comprised 0.6 wt. % VOx and 2.7 wt. % $MoO_3$ on $TiO_2$ was prepared combining titania with a mixture of ammonium metavanadate dissolved in hot monoethanolamine, then kneading the mixture to form a paste. Crystalline ammonium heptamolybdate tetrahydrate was added directly into the paste, and the mixture was further kneaded.

Titanium oxide (anatase) (269.47 g) was combined with a mixture of ammonium metavanadate (2.23 g) in monoethanolamine (MEA) (5.1 g), then this mixture was kneaded into a paste. Crystalline ammonium heptamolybdate tetrahydrate (9.60 g) was added directly into the paste, and kneading continues. The catalyst comprised 0.6 wt. % $VO_x$ and 2.7 wt. % $MoO_3$ on $TiO_2$.

Glass fibers (13.3 g), binders (0.78 g), rheology modifiers (6.8 g) were then added and mixed well. The paste was pressed onto stainless-steel mesh, and the resulting plates were calcined for about 1 hour at a temperature of 560° C. The laminated article had a plate thickness of 0.99 mm and a catalyst film having a thickness of 0.40 mm, as measured by a Vernier Caliper. The laminated plates had total masses ranging from about 18 to about 22 g and averaged about 20 g.

General Procedure for Evaluating kNOx/kSOx

Each catalyst strip was mounted vertically in a reaction tube and a synthetic gas mixture was passed through the reaction tube. The synthetic gas mixture for NOx testing was different than the synthetic mixture for SOx testing. The compositions of the synthetic gas mixtures are provided below.

The composition of inlet and outlet gases to and from the reactor was determined by on-line FTIR spectroscopy, which analyzes for multiple compounds simultaneously. The sample cell temperature was kept at about 230° C. to avoid water condensation and salt formation inside the instrument. For NOx conversion, the inlet and outlet concentrations of $NH_3$ and NOx are compared. A condenser and gas washing bottle are used to extract $SO_2$ and $SO_3$, and the concentration of each is determined by titration using a G20 Compact Mettler Toledo titrator.

1. NOx testing: Four catalyst strips were mounted vertically in a reaction tube with 6.5 mm spacing between the strips and a synthetic diesel exhaust gas mixture was passed through the reaction tube. The composition of a synthetic exhaust gas mixture at the inlet to the reaction tube was about 400 ppm NO, 400 ppm $NH_3$, 5% $O_2$, 10% $H_2O$, 500 ppm $SO_2$, with the remainder of the gas being $N_2$. This including ammonia that was used as the reductant. The following information relates to the gas flow: Total flow: 74.0 L/min.; nominal area velocity: 55.5 m/h; nominal linear velocity: 1.71 m/s; nominal space velocity: 15400 $h^{-1}$. NOx conversion was determined under isothermal conditions at 320° C., 350° C., or 382° C.

2. SOx testing: Each catalyst strip was mounted vertically in a reaction tube and a synthetic exhaust gas mixture was passed through the reaction tube. The composition of the exhaust gas mixture at the inlet to the reaction tube was 0 ppm NO, 0 ppm $NH_3$, 5% $O_2$, 10% $H_2O$, 500 ppm $SO_2$, with the remainder of the gas being $N_2$. The following information relates to the gas flow: total flow: 16.6 L/min.; nominal area velocity: 12.5 m/h; nominal linear velocity: 0.39 m/s; nominal space velocity: 3470 $h^{-1}$. SOx conversion was determined under isothermal conditions at 400° C.

Values for kNOx (382° C.) and kSOx (400° C.) are calculated from the following rate expressions:

$$kSOx = -(Q/V_c)\ln(1-X_{SO2})$$

and $$kNOx = -AV\ln(1-X_{NOx})$$

where Q is total flow (m³/h), $V_c$ is total catalyst volume (m³), $X_{SO2}$ is the fractional conversion of $SO_2$, AV is area velocity (m/h), which is defined as $AV = Q/(V_c a)$; where a is geometric surface area per unit volume (m²/m³) and $X_{NOx}$ is the fractional conversion of $NO_x$. kNOx is calculated taking into account the geometric surface area of the catalyst (m²/m³), while kSOx is calculated based on the catalyst volume (m³). Values of kNOx are reported in units of m/h, and values of kSOx are reported in units of h⁻¹.

Catalysts used for the laminated article of Comparative Example 1 and the spray-coated article of Example 2 have the same final composition (0.6 wt. % $VO_x$, 2.7 wt. % $MoO_3$ on $TiO_2$), and both plates have similar catalyst film thicknesses (about 400 μm), but the spray-coated strips have lower mass. As shown in Tables 1 and 2, the spray-coated articles have higher kNOx values at all three temperatures and a lower average kSOx value at 400° C. when compared with the laminated articles. Consequently, the kNOx/kSOx ratios for the spray-coated articles are significantly greater when compared with those of the laminated articles.

Catalysts that can provide increased kNOx/kSOx ratios are desirable for achieving the best possible reduction in NOx while also minimizing the amount of sulfur trioxide (principal acid rain component) generated.

TABLE 1

| Example Article Type | 1 Spray-coated | | | C2 Laminated | | |
|---|---|---|---|---|---|---|
| Temperature (° C.) | 320 | 350 | 382 | 320 | 350 | 382 |
| Conversion, % | 47.3 | 58.5 | 59.3 | 48.3 | 53.2 | 55.6 |
| kNOx (m/h) | 36.5 | 50.2 | 51.3 | 35.2 | 40.6 | 43.4 |

NOx Conversion

TABLE 2

SOx Conversion

| Example Article type | 1 Spray-coated | | | C2 Laminated | | |
|---|---|---|---|---|---|---|
| | SOx (ppm) | SO₃ (ppm) | % conversion | SOx (ppm) | SO₃ (ppm) | % conversion |
| Average | 538 | 3.76 | 0.71 | 583 | 5.02 | 0.86 |
| kSOx (h⁻¹) | 174 | | | 212 | | |
| kNOx/kSOx | 51.3/174 = 0.295 | | | 43.4/212 = 0.205 | | |

The above concentrations of SOx and $SO_3$ were measured at the outlet of the reactor.

The values of kNOx/kSOx are calculated from kNOx measured at 382° C.

EXAMPLE 3

Preparation of a Spray-Coated Vanadate/Tungstate Article

Ammonium metavanadate and a titania containing 10% $WO_3$ were suspended in water (about 315 g) and combined under high-shear conditions with a colloidal silica dispersion (40% dispersion, 69.30 g) and alumina fibers (9.25 g). The resulting aqueous washcoat (500 g) has 37% solids content and a pH of 3.35. The solids in the washcoat comprise 1.7 wt. % dispersed metavanadate and 10 wt. % $WO_3$ on $TiO_2$.

Three strips of perforated stainless-steel mesh (400 mm×25 mm×600 μm) were calcined at 750° C. in a flat position. The mesh strips were heated on a hot plate to 150° C. The vanadate-containing washcoat was applied from a spray gun directly onto the heated mesh strips. After five or six sprays on both sides of the strips, from 1.65 to 1.92 g of catalyst was deposited on each strip. The strips were calcined for 2 h at 500° C. The spray-coated article had a thickness of about 0.84 mm.

The NOx reduction and SOx oxidation activities of the spray-coated article of Example 3 were measured as described earlier (except as indicated below) and compared with those from the laminated article of Comparative Example 2. The results are shown in Table 3.

NOx testing: Temperature: 382° C.; nominal area velocity: 74.0 m/h; nominal space velocity: 15,400 h⁻¹.

SOx testing: Nominal area velocity: 16.6 m/h; nominal linear velocity: 0.38 m/s; nominal space velocity: 3450 h⁻¹.

TABLE 3

Summary of NOx reduction and SOx oxidation test results

| Example | Catalyst | article thickness (mm) | kNOx (382° C.) | kSOx (400° C.) | kNOx/kSOx |
|---|---|---|---|---|---|
| 3 | 1.7% $VO_x$/10% $WO_3$/$TiO_2$ | 0.84 | 58.9 | 199 | 0.296 |
| C2 | 0.6% $VO_x$/2.7% $MoO_3$/$TiO_2$ | 0.99 | 43.2 | 210 | 0.206 |

Example 3 demonstrates that spray coating enables high catalyst loadings when compared with laminated articles. Although its catalyst film is thinner, the spray-coated article incorporates a much higher concentration of active catalyst components and generates a higher kNOx/kSOx ratio.

The preceding examples are intended only as illustrations; the following claims define the scope of the invention.

We claim:

1. A method of producing an article for catalyzing the conversion of nitrogen oxides in a gas containing nitrogen oxides (NOx) and a reductant, which article comprising:
   (i) a substrate; and
   (ii) a catalyst film deposited on the substrate, wherein the catalyst film comprises $VO_x$, $MoO_3$ or $WO_3$, and $TiO_2$, the method comprising forming the catalyst film on the substrate by:
   (a) spray coating the substrate with a washcoat suspension comprising:
      (A) (i) $VO_x$ or a $VO_x$ precursor,
         (ii) $MoO_3$, a $MoO_3$ precursor, $WO_3$, a $WO_3$ precursor or a mixture thereof, and
         (iii) $TiO_2$ or a $TiO_2$ precursor,
      (B) an additive; and
      (C) water,
   wherein a solids content in the washcoat suspension is within the range of from 30 to 40 wt. % and the water in the washcoat suspension is within the range of from 60 to 70 wt. %, each relative to the total weight of the washcoat suspension; and
   (b) calcining the coated substrate;
   wherein the catalyst film comprises catalysts solids comprising:
      $VO_x$, in a range of from 0.5 to 2 wt. %;
      $MoO_3$, $WO_3$, or a mixture thereof, in a range of from 1 to 10 wt. %; and
      $TiO_2$, in a range of from 88 to 98 wt. %,
      each wt. % of the catalyst solids being relative to the total weight of the catalyst film.

2. The method according to claim 1, wherein the substrate is a used catalyst on the substrate and the method comprises the additional step preceding step (a) of removing particulates from the substrate and the used catalyst on the substrate.

3. The method according to claim 1, wherein the catalyst film has a thickness of from about 20 μm to about 500 μm.

4. The method according to claim 1, wherein the substrate is a monolith or a plate.

5. The method according to claim 1, wherein the substrate is perforated.

6. The method according to claim 1, wherein the substrate comprises steel.

7. The method according to claim 1, wherein calcining the coated substrate is performed at a temperature within the range of from 400° C. to 1200° C.

8. The method according to claim 1, wherein the additive is selected from the group consisting of glass particles, alumina, silica, silica-aluminas, ceramics, molecular sieves, zeolites, clays, inorganic oxides, minerals and polymers.

9. The method according to claim 1, wherein the catalyst film comprises catalyst solids in a range of from 50 to 99 wt. % of the catalyst film and the additives in a range of from 1 to 50 wt. % of the catalyst film.

10. An article obtained according to the method of claim 1, wherein the article also catalyzes the conversion of $SO_x$ in a gas containing the $NO_x$ and the $SO_x$ and the conversions of $NO_x$ and $SO_x$ occur at rates $kNO_x$ and $kSO_x$, respectively, and the ratio of $kNO_x/kSO_x$ is in a range of from 0.22 to 0.35.

11. A process for selectively reducing nitrogen oxides in a gaseous mixture, the process comprising contacting a gaseous mixture comprising nitrogen oxides with a reductant in the presence of the article of claim 10.

12. The process of claim 11, wherein the step of contacting a gaseous mixture comprising nitrogen oxides with a reductant is performed at a temperature within the range of from 100° C. to 650° C.

13. The method of claim 1, wherein the catalyst film has a thickness of from about 50 μm to about 150 μm.

14. The process of claim 11, wherein the reductant is ammonia.

15. The article of claim 10, wherein the ratio of $kNO_x/kSO_x$ is in a range of from 0.222 to 0.30.

16. The method of claim 1, wherein the substrate is heated before spray coating the substrate with the washcoat suspension.

* * * * *